J. J. HOLSEN.
RECLEANER STRUCTURE FOR THRESHING MACHINES.
APPLICATION FILED NOV. 9, 1916.
1,241,980.
Patented Oct. 2, 1917.
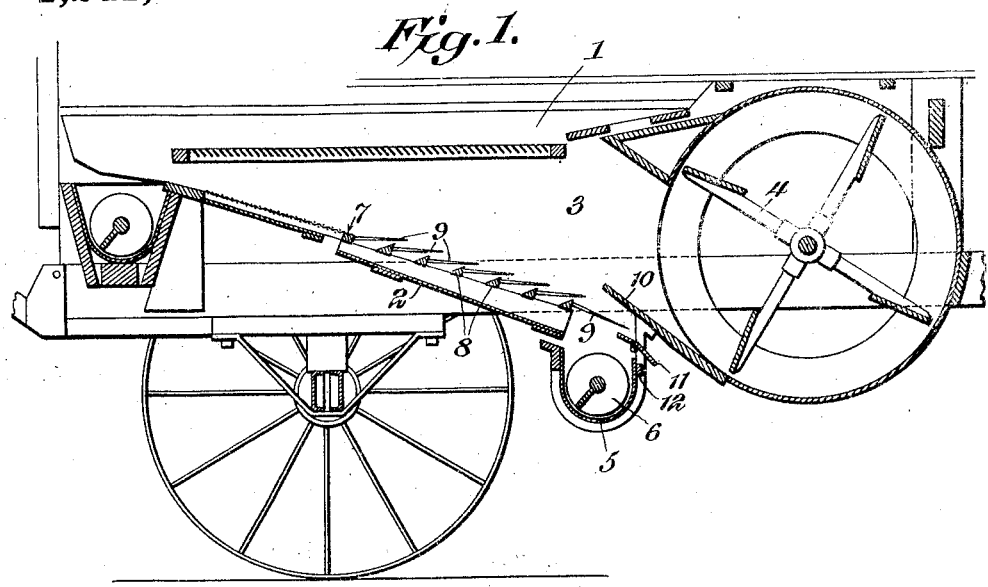
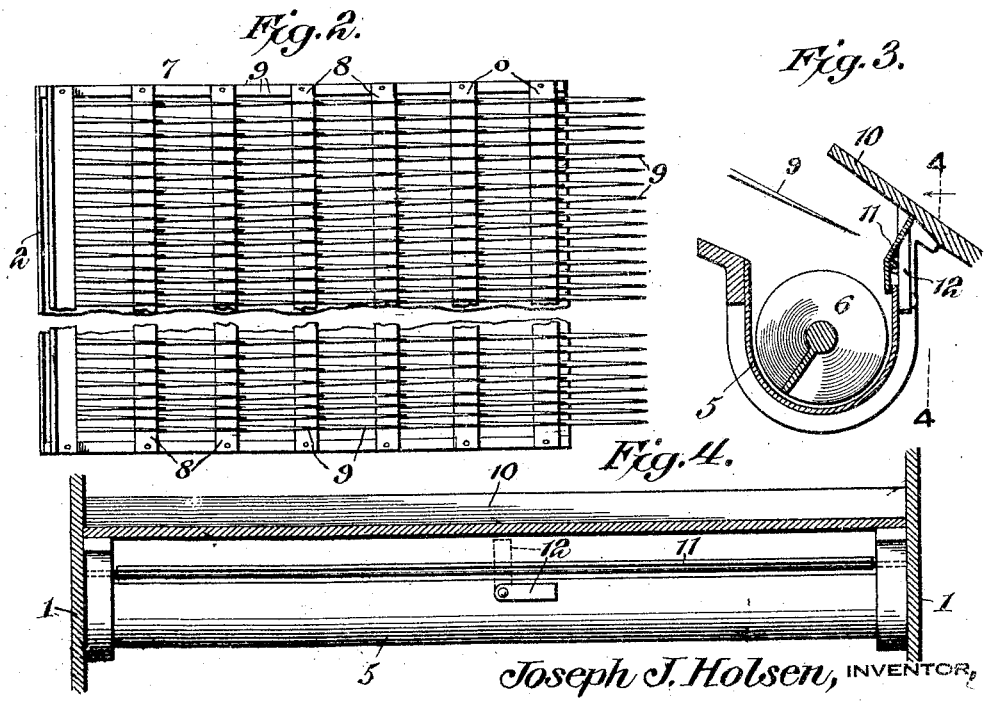
Joseph J. Holsen, INVENTOR,
WITNESSES
BY
ATTORNEY

UNITED STATES PATENT OFFICE.

JOSEPH J. HOLSEN, OF MANITOWOC, WISCONSIN.

RECLEANER STRUCTURE FOR THRESHING-MACHINES.

1,241,980.  Specification of Letters Patent.  Patented Oct. 2, 1917.

Application filed November 9, 1916. Serial No. 130,409.

*To all whom it may concern:*

Be it known that I, JOSEPH J. HOLSEN, a citizen of the United States, residing at Manitowoc, in the county of Manitowoc and State of Wisconsin, have invented a new and useful Recleaner Structure for Threshing-Machines, of which the following is a specification.

This invention has reference to recleaner structures for threshing machines, and is designed to eliminate deleterious matter which often finds its way through the threshing machine and contaminates the threshed grain, and also to save grain, especially oats and barley.

In threshing machines the threshed grain is usually deposited upon a conveyer and passed over a sieve and ultimately reaches a grain auger by means of which the supposedly clean grain is delivered from the machine. However, it is found in actual practice that such cleaners do not effectively eliminate thistle heads and other matter sufficiently heavy to find its way on to the shoe which delivers to the grain auger.

With the present invention provision is made for the discharge of such materials from the machine in a manner to escape deposition into the channel containing the grain auger, but without loss of the clean grain. As such machines are used not only for threshing wheat and the like, but for threshing peas, provision is made for the use of a machine provided with a recleaner for peas, as well as wheat or other such grain.

The invention comprises a heddle structure adapted to lie over the shoe directing the cleaned grain to the grain auger. Such shoe catches thistle heads or other like material, and these heads are discharged over and beyond the grain auger, but the device in no wise prevents the fall of the threshed grain into the chute in which the grain auger is mounted. In order to avoid the cleaning blasts of air used in threshing machines from carrying the separated thistle heads or other such material back into the stream of grain, there is provided a blind or damper along both sides of which the air stream may pass, and thus avoid violent movements of the air, which blind serves to direct the separated thistle heads and the like and discharge them upon the ground. The blind is made to rock so that it may be closed when it is desired to thresh peas, and thus prevent any of them from reaching the ground.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a longitudinal vertical section of the portion of a threshing machine to which the recleaning structure is applied.

Fig. 2 is a plan view of the heddle along which the grain is passed and by which the thistle heads and the like are separated from the grain.

Fig. 3 is a cross section of the grain auger and adjacent parts, showing the blind or deflector by means of which the thistle heads are discharged from the machine and prevented from reaching the grain auger.

Fig. 4 is a section on the line 4—4 of Fig. 3.

Referring to the drawings, there is shown a portion 1 of a threshing machine, this portion including a shoe 2 underlying the customary conveyer sieve for the grain, and located in the duct 3 into which there discharges the air set into motion by a fan 4. The shoe 2 in turn discharges into a channel 5 containing a grain auger 6. The parts described are those found in existing forms of threshing machines and require no special description and are mentioned merely to permit location of the parts comprising the present invention.

Over the shoe 2 and in close relation thereto is a heddle 7 formed of cross strips 8, each of preferably triangular cross-section with the apex uppermost, and projecting from each strip 8 is a series of tines 9. The heddle partakes of the slant of the shoe 2 and the tines 9 all project toward the auger 6, said tines having a slight downward slant, so that material lodged on the tines will tend to gravitate therefrom. The tines taper from their butt to their free ends so that the spaces between adjacent tines widen in the direction of travel over the heddle, whereby clogging is prevented. The tines are so arranged that any relatively large material lodging thereon and too large to pass between the tines will move along the tines toward the free ends thereof and fall from one row of tines to another until the material ultimately escapes from the last and lowermost row of tines.

Extending from the casing to the fan 4 is a board 10 partially overlying the auger 6 and also overlying the lowermost row of tines 9. Extending along the chute or trough 5 from side to side of the machine is an angle strip 11 constituting a blind or deflector rockable on pivots at the ends and having associated therewith a button 12 or other device whereby the blind or deflector 11 may be held in what may be termed the closed position. Thus the blind or deflector constitutes in effect a continuation of the corresponding wall of the trough 5.

When the device is being used for the threshing of wheat or other similar grain, the blind or deflector 11 is released from the button 12 and then rocks to a position so that one long edge of the deflector is underneath the lowermost row of tines 9 and the other long edge of the deflector is directed toward the exterior of the machine. The deflector being bent intermediately along its length is shaped to provide a discharging side slanting downwardly. Moreover, the deflector is located beneath the board 10 and above the chute 5, and when open there are spaces both above and below it for the passage of air. This breaks up any tendency to the formation of strong air currents, especially between the deflector and the board 10, since there is a space beneath the deflector as well as above it.

When grain reaches the heddle it will fall upon the tines 9 and through the spaces between them, finally reaching the shoe 2, and ultimately discharging upon the auger 6 to be conveyed to and discharged from the side of the machine in the usual manner.

Any other material, such as thistle heads or the like, finding their way upon the tines 9 are retained thereby, since the spacing between the tines is too small to permit the passage of the thistle heads between them. Such thistle heads, therefore, gravitate along the heddle, falling from one row of tines to the other, but the upper edges of the strips 8 prevent any chance of the heads being blown back and finding their way between a row of tines and over a corresponding bar 8 on to the shoe 2. When the thistle heads ultimately reach the lower end of the lowermost row of tines they fall therefrom upon the upper surface of the then open blind 11, and the latter having a downward slant directs these thistle heads away from the chute 5 and on to the ground or other suitable point of disposal. Any current of air which may be flowing over the open blind is rendered gentle because of the division of the current of air both above and below the blind, and hence any current of air strong enough to blow back the thistle heads or other large and heavy material is avoided.

When it is desired to thresh peas the blind is closed and it may then be held in the closed position by the button 12, for in the case of peas they might roll over the tines and be discharged upon the floor or ground if the blind were open. When wheat or the like is being threshed there is always the liability of straws or thistle heads finding their way to the grain auger, but with the recleaning structure such deleterious matter which might otherwise contaminate the grain is eliminated by the second cleaning to which the grain is subjected before reaching the auger.

The recleaning structure is readily applied to various makes of threshing machines with but little change in structure either of the recleaning device or the threshing machine.

When threshing grain with thistles in it, the sieve usually supplied for separating the chaff is not sufficiently effective. The usual procedure is to close the sieve to keep the thistle heads from the grain that goes to the bags, wherefore the elevator carries considerable grain back to the cylinder. This produces an overload in the separating mechanism and more or less grain runs over with the chaff and goes to waste. The recleaner avoids this and the grain heretofore wasted is saved.

What is claimed is:—

1. A recleaner attachment for threshing machines for association with the grain auger of the machine, comprising a sieve made up of a slanting stepped series of tines with the lowermost tines overlying the grain auger, and a blind or deflector at the lower end of the series in position to receive material therefrom for directing material carried by the series of tines to a point of discharge away from the grain auger.

2. A recleaner attachment for threshing machines for association with the grain auger of the machine, comprising a sieve made up of a slanting stepped series of tines with the lowermost tines overlying the grain auger, and a blind or deflector at the lower end of the series in position to receive material therefrom for directing material carried by the series of tines to a point of discharge away from the grain auger, said blind or deflector being rockable for movement into interposing relation to a stream of material discharged from the sieve and to direct such stream to the grain auger.

3. A recleaning attachment for threshing machines for association with the grain auger, shoe leading thereto and cleaning fan associated with the grain auger, comprising a sieve made up of a stepped series of tines slanting toward the grain auger with each series of tines having a supporting bar therefor extending crosswise of the length of the sieve and having a rising edge extending above the tines where projecting from the cross bar and into close relation to the next higher series of tines.

4. In an attachment for a threshing machine having a grain auger and a fan associated with the grain auger, a sieve extending over the grain auger and discharging beneath the fan away from the auger, and a blind or valve interposed between the grain auger and the fan and movable to close the space between the grain auger and the fan or to open the same for the passage of air both above and below the valve.

5. A recleaning attachment for a threshing machine having a grain auger and a blower fan associated therewith, comprising a sieve overlying the grain auger and having its discharge end in superposed relation to the grain auger, and a deflector underlying the discharge end of the sieve for directing material issuing therefrom away from the grain auger and out of the way of both the fan and the grain auger.

In testimony that I claim the foregoing as my own, I have hereto affixed my signature in presence of two witnesses.

JOSEPH J. HOLSEN.

Witnesses:
   Jos. Zahorik,
   Rose Wanish.